(12) United States Patent
Abuaiadh et al.

(10) Patent No.: US 7,822,790 B2
(45) Date of Patent: Oct. 26, 2010

(54) RELATIVE POSITIONING AND ACCESS OF MEMORY OBJECTS

(75) Inventors: Diab Abuaiadh, Haifa (IL); Victor Leikehman, Ramat Yishai (IL)

(73) Assignee: International Business Machines Corporation, Armonk, NY (US)

( * ) Notice: Subject to any disclaimer, the term of this patent is extended or adjusted under 35 U.S.C. 154(b) by 782 days.

(21) Appl. No.: 10/744,724

(22) Filed: Dec. 23, 2003

(65) Prior Publication Data

US 2005/0138092 A1 Jun. 23, 2005

(51) Int. Cl.
*G06F 12/00* (2006.01)
*G06F 17/30* (2006.01)
(52) U.S. Cl. ..................... 707/813
(58) Field of Classification Search ............. 707/206, 707/999.206, 813
See application file for complete search history.

(56) References Cited

U.S. PATENT DOCUMENTS 5,870,764 A * 2/1999 Lo et al. ............... 707/203

2003/0229766 A1* 12/2003 Dice et al. ............ 711/154
2004/0128329 A1 7/2004 Ben-Yitzhak et al.
2005/0114413 A1* 5/2005 Subramoney et al. ..... 707/206

OTHER PUBLICATIONS

Ben-Yitzhak, Ori et al. "An Algorithm for Parallel Incremental Compaction." ISMM '02, Jun. 20-21, 2002, Berlin, Germany. ACM: 2002.*
O. Ben-Yitzhak et al., "An Algorithm for Parallel Incremental Compaction", Proceedings of the 3rd international symposium on Memory management, Berlin, Germany, Session: Concurrency, Parallelism, Distribution (2), 2003 pp. 100-105.

* cited by examiner

*Primary Examiner*—John R. Cottingham
*Assistant Examiner*—Kimberly Lovel

(57) ABSTRACT

A garbage collector including a bit mapper operative to designate a plurality of regions within a memory, associate any of a plurality of objects with any of the regions if the start address of the object to be associated lies within the region, and record the relative location of a group of objects within any of the regions, a mover operative to relocate any of the groups of objects found within a source region from among the regions to begin at a destination address, and a fixer operative to record the destination address at an index corresponding to the source region.

2 Claims, 12 Drawing Sheets

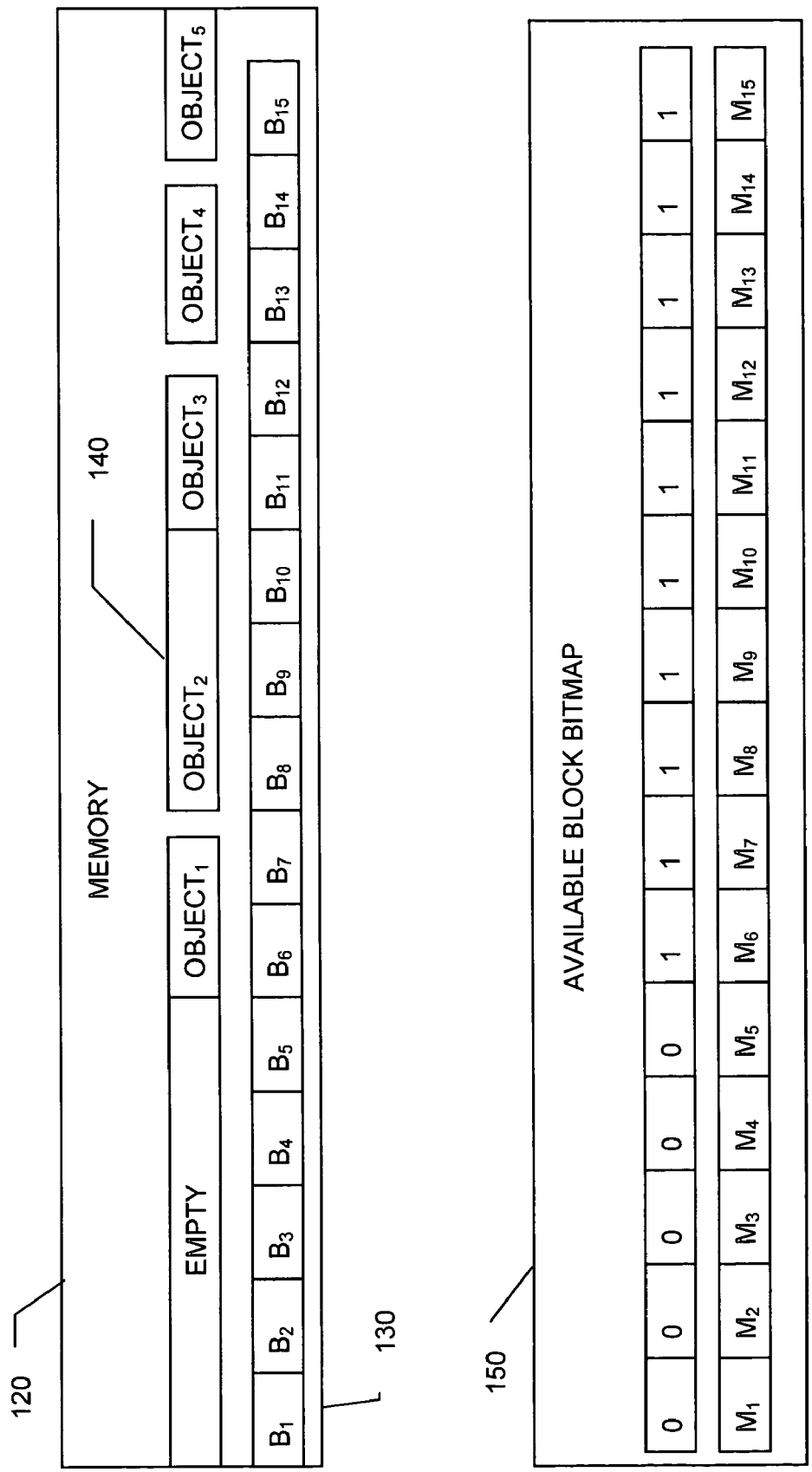

of memory for utilization by the application into which the application places its objects. In the course of its execution, an application may no longer require an object, allowing the object's location in memory to be reclaimed for storing other objects. This process of reclamation is popularly known as garbage collection (GC).

RELATIVE POSITIONING AND ACCESS OF MEMORY OBJECTS

FIELD OF THE INVENTION

The present invention relates to computer memory garbage collection in general, and more particularly to object relocation and reference fixup.

BACKGROUND OF THE INVENTION

Computer operating environments, such as the Java Virtual Machine (JVM), typically provide a mechanism for applications to store "objects" of data. Often, the operating environment dynamically allocates a section of memory for utilization by the application into which the application places its objects. In the course of its execution, an application may no longer require an object, allowing the object's location in memory to be reclaimed for storing other objects. This process of reclamation is popularly known as garbage collection (GC).

Garbage collectors from the mark-sweep family suffer from memory fragmentation, which refers to the creation of relatively small holes of unused space between objects. To reduce fragmentation the GC may compact memory by reducing the space between objects and thus create chunks of larger free space, making allocation more efficient, and practically reducing the memory footprint of the application. During compaction, "fixup" of object memory addresses is typically performed to keep track of each object's new location for future reference.

Unfortunately, compaction algorithms tend to require large amounts of auxiliary data structures, such as forwarding references or break tables. Moreover when searching for a previously stored objects, forwarding references may require additional auxiliary memory accesses.

SUMMARY OF THE INVENTION

The present invention discloses a system and method for relative positioning of memory objects.

In one aspect of the present invention a garbage collector is provided including a bit mapper operative to designate a plurality of regions within a memory, associate any of a plurality of objects with any of the regions if the start address of the object to be associated lies within the region, and record the relative location of a group of objects within any of the regions, a mover operative to relocate any of the groups of objects found within a source region from among the regions to begin at a destination address, and a fixer operative to record the destination address at an index corresponding to the source region.

In another aspect of the present invention the bit mapper is operative to construct an old relative location bitmap including a series of bits, with each bit $o_n$ positionally corresponding to a block $b_n$ in the memory.

In another aspect of the present invention the bit mapper is operative to set any of the bits to indicate that the corresponding block includes the start address of any of the objects that lay within the source region.

In another aspect of the present invention the mover is operative to compact the group of objects.

In another aspect of the present invention the mover is operative to preserve the relative order and position of the objects within the group of objects to one another.

In another aspect of the present invention the mover is operative to relocate the group of objects such that no other object from outside the group of objects is inserted between objects within the relocated group.

In another aspect of the present invention the bit mapper is operative to construct a new relative location bitmap including a series of bits, with each bit $o_n$ positionally corresponding to a block $b_n$ in the memory.

In another aspect of the present invention the bit mapper is operative to set any of the bits to indicate that the corresponding block includes the start address of any of the relocated objects.

In another aspect of the present invention the fixer further includes a calculator operative to determine the new start address of a desired object among any of the relocated objects.

In another aspect of the present invention the fixer is operative to reassign a pointer to any of the objects in the source region to the address of the object after the object is relocated.

In another aspect of the present invention the calculator is operative to receive the old start address of the desired object, determine the source region within which the desired object originated, determine the relative position of the desired object within the source region, determine the new start address of the first object in the relocated group of objects, determine the block in which the start address of the desired object lies as being at the same relative position from the destination address as in the source region, and calculate the current address of the desired object by adding multiples of the block size to the new start address until the block in which the start address of the desired object lies is reached.

In another aspect of the present invention a garbage collector is provided including a bit mapper operative to designate a plurality of regions within a memory, and associate any of a plurality of objects with any of the regions if the start address of the object to be associated lies within the region, a mover operative to relocate each object in a group of the objects found within a source region from among the regions at an offset within the memory from its current location in the source region such that the distances between the objects within the group are preserved, and a fixer operative to record the offset at an index corresponding to the source region.

In another aspect of the present invention the mover is operative to preserve the relative order and position of the objects within the group of objects to one another.

In another aspect of the present invention the mover is operative to relocate the group of objects such that no other object from outside the group of objects are inserted between objects within the relocated group.

In another aspect of the present invention the fixer further includes a calculator operative to determine the new start address of a desired object among any of the moved objects.

In another aspect of the present invention the fixer is operative to reassign a pointer to any of the objects in the source region to the address of the object at the offset.

In another aspect of the present invention the calculator is operative to receive the old start address of the desired object, determine the source region within which the desired object originated, determine the offset corresponding to the source region, and calculate the current address of the desired object by adding the offset to the old start address.

In another aspect of the present invention a method is provided for relative positioning of memory objects, the method including designating a plurality of regions within a memory, associating any of a plurality of objects with any of the regions if the start address of the object to be associated lies within the region, recording the relative location of a group of objects within any of the regions, relocating any of the groups of objects found within a source region from among the regions to begin at a destination address, and storing the destination address at an index corresponding to the source region.

In another aspect of the present invention the recording step includes constructing an old relative location bitmap including a series of bits, with each bit $o_n$ positionally corresponding to a block $b_n$ in the memory.

In another aspect of the present invention the recording step includes setting any of the bits to indicate that the corresponding block includes the start address of any of the objects that lay within the source region.

In another aspect of the present invention the relocating step includes compact the group of objects.

In another aspect of the present invention the relocating step includes preserving the relative order and position of the objects within the group of objects to one another.

In another aspect of the present invention the relocating step includes relocating the group of objects such that no other object from outside the group of objects is inserted between objects within the relocated group.

In another aspect of the present invention the method further includes constructing a new relative location bitmap including a series of bits, with each bit $o_n$ positionally corresponding to a block $b_n$ in the memory.

In another aspect of the present invention the method further includes setting any of the bits to indicate that the corresponding block includes the start address of any of the relocated objects.

In another aspect of the present invention the method further includes determining the new start address of a desired object among any of the relocated objects.

In another aspect of the present invention the method further includes reassigning a pointer to any of the objects in the source region to the address of the object after the object is relocated.

In another aspect of the present invention the determining step includes receiving the old start address of the desired object, determining the source region within which the desired object originated, determining the relative position of the desired object within the source region, determining the new start address of the first object in the relocated group of objects, determining the block in which the start address of the desired object lies as being at the same relative position from the destination address as in the source region, and calculating the current address of the desired object by adding multiples of the block size to the new start address until the block in which the start address of the desired object lies is reached.

In another aspect of the present invention a method is provided for relative positioning of memory objects, the method including designating a plurality of regions within a memory, and associating any of a plurality of objects with any of the regions if the start address of the object to be associated lies within the region, relocating each object in a group of the objects found within a source region from among the regions at an offset within the memory from its current location in the source region such that the distances between the objects within the group are preserved, and storing the offset at an index corresponding to the source region.

In another aspect of the present invention the relocating step includes preserving the relative order and position of the objects within the group of objects to one another.

In another aspect of the present invention the relocating step includes relocating the group of objects such that no other object from outside the group of objects are inserted between objects within the relocated group.

In another aspect of the present invention the method further includes determining the new start address of a desired object among any of the moved objects.

In another aspect of the present invention the method further includes reassigning a pointer to any of the objects in the source region to the address of the object at the offset.

In another aspect of the present invention the determining step includes receiving the old start address of the desired object, determining the source region within which the desired object originated, determining the offset corresponding to the source region, and calculating the current address of the desired object by adding the offset to the old start address.

In another aspect of the present invention a computer program is provided embodied on a computer-readable medium, the computer program including a first code segment operative to designate a plurality of regions within a memory, a second code segment operative to associate any of a plurality of objects with any of the regions if the start address of the object to be associated lies within the region, a third code segment operative to record the relative location of a group of objects within any of the regions, a fourth code segment operative to relocate any of the groups of objects found within a source region from among the regions to begin at a destination address, and a fifth code segment operative to store the destination address at an index corresponding to the source region.

In another aspect of the present invention a computer program is provided embodied on a computer-readable medium, the computer program including a first code segment operative to designate a plurality of regions within a memory, and a second code segment operative to associate any of a plurality of objects with any of the regions if the start address of the object to be associated lies within the region, a third code segment operative to relocate each object in a group of the objects found within a source region from among the regions at an offset within the memory from its current location in the source region such that the distances between the objects within the group are preserved, and a fourth code segment operative to storing the offset at an index corresponding to the source region.

BRIEF DESCRIPTION OF THE DRAWINGS

The present invention will be understood and appreciated more fully from the following detailed description taken in conjunction with the appended drawings in which:

FIG. 1B is a pictorial representation of memory storage, useful in understanding the present invention;

DETAILED DESCRIPTION OF PREFERRED EMBODIMENTS

Figure 1A:
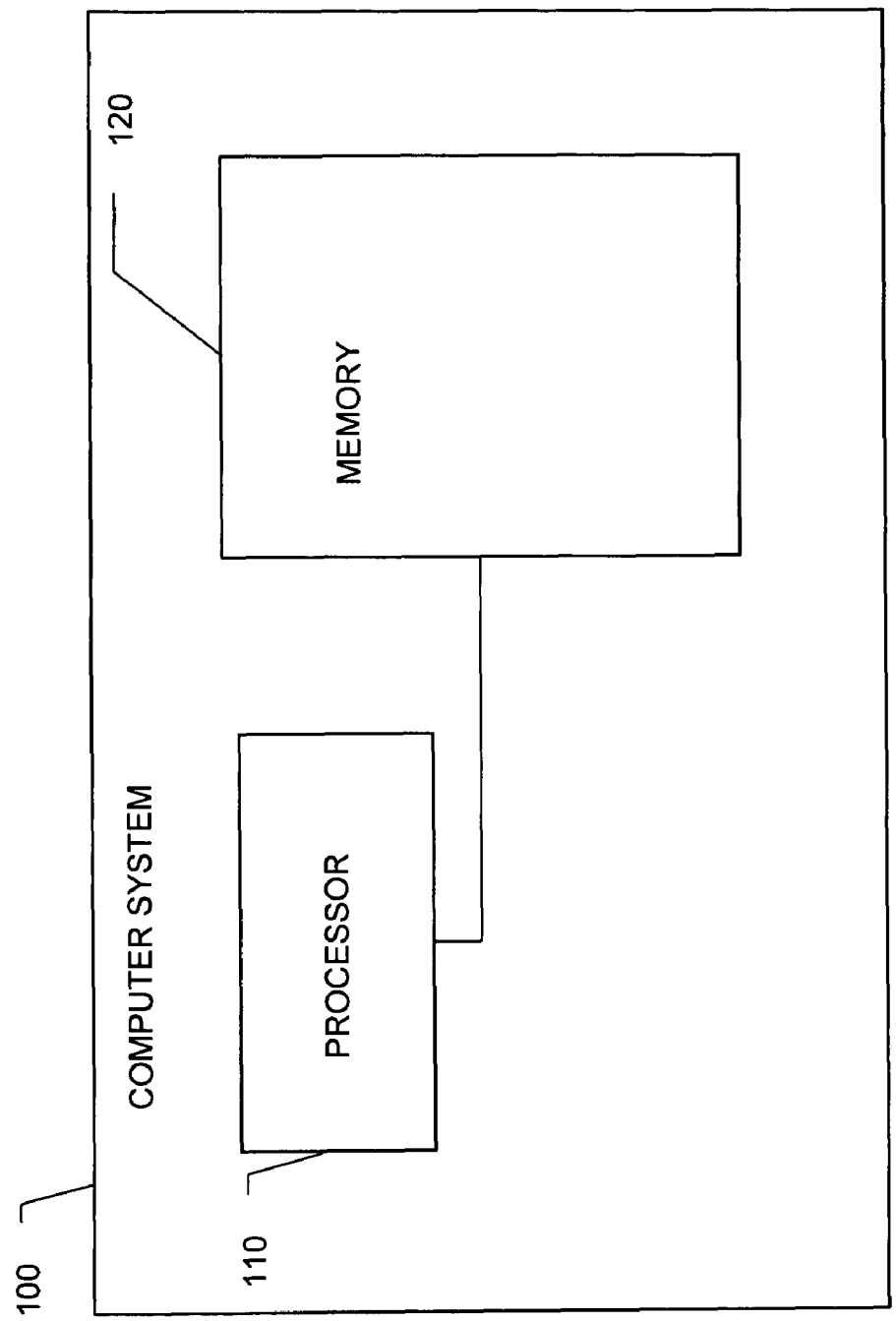
FIG. 1A is a simplified block diagram of a computer system, useful in understanding the present invention.

Reference is now made to FIG. 1A, which is a simplified block diagram of a computer system, and additionally to FIG. 1B, which is a simplified pictorial representation of memory storage, both useful in understanding the present invention. A typical Computer System 100 includes a Processor 110 and a Memory 120, such as Heap Memory. Processor 110 typically processes data and stores data objects in Memory 120 for later retrieval.

Memory 120 typically includes one or more contiguous Blocks 130 of memory, each block denoted as $B_n$. Each Block 130 is typically of a fixed size of n bytes, and may be used to store an Object 140 or part thereof. Preferably, the start of each Object 140 is aligned with the start of a Block 130.

Computer System 100 may utilize an Available Block Bitmap 150 to help identify blocks in Memory 120 in which objects are stored. Available Block Bitmap 150 is typically composed of a memory bit vector where the first bit $M_1$ in Available Block Bitmap 150 positionally corresponds to the first Block $B_1$ in Memory 120, the second bit $M_2$ in Available Block Bitmap 150 positionally corresponds to the second Block $B_2$ in Memory 120, and so on (the scale of Available Block Bitmap 150 and of Memory 120 are not depicted equally in FIG. 1B). Each bit $M_i$ is typically set, such as to 1, if an Object 140 or a part thereof occupies its corresponding block $B_i$, or "unset," such as to 0, if the corresponding block $B_i$ is not used for storing an object. In this manner Available Block Bitmap 150 provides a means for determining the availability of blocks in Memory 120 for storing new objects.

Figure 2A:
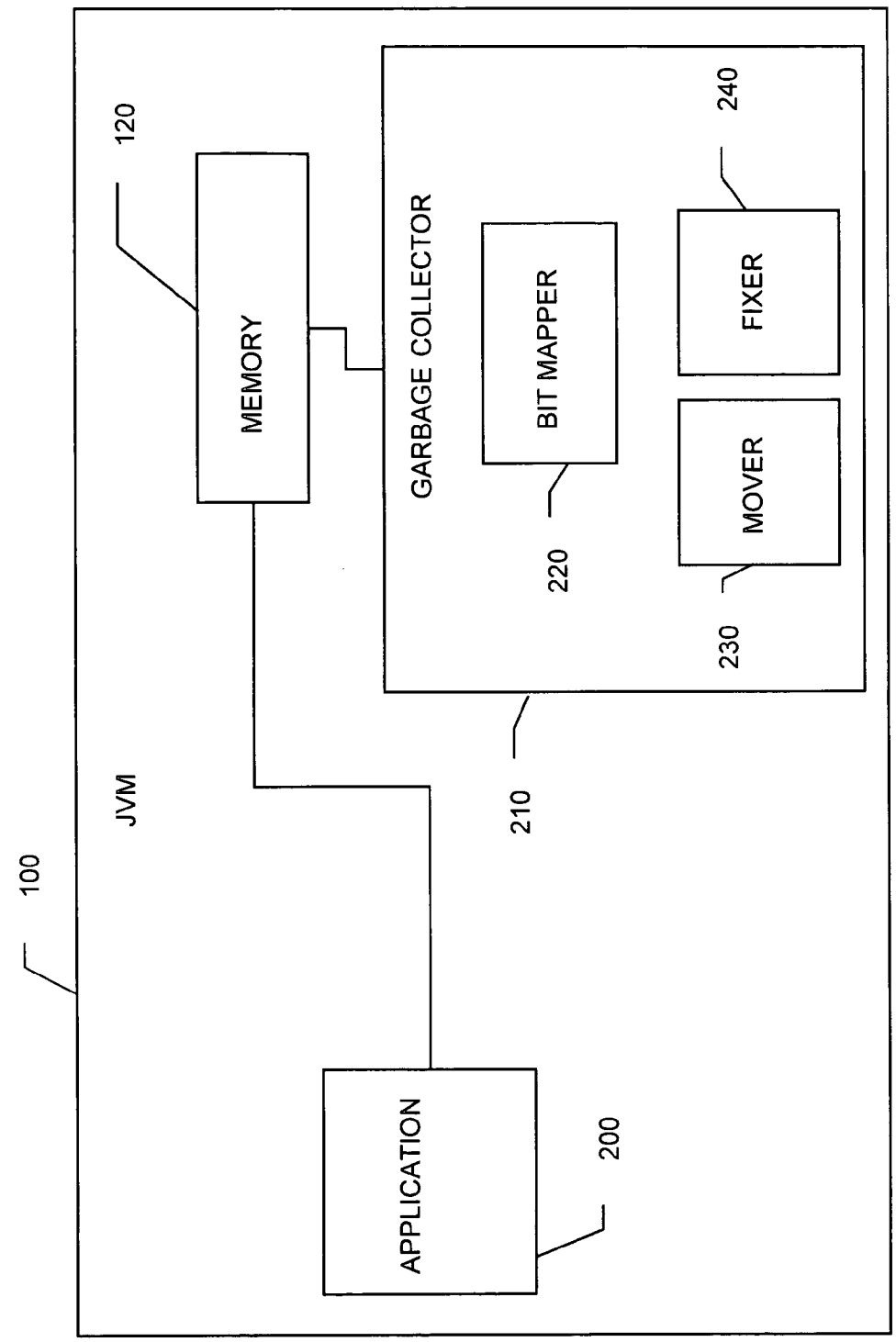
FIG. 2A is a simplified block diagram of a memory compaction and fixup system, constructed and operative in accordance with a preferred embodiment of the present invention.
Figure 2B:
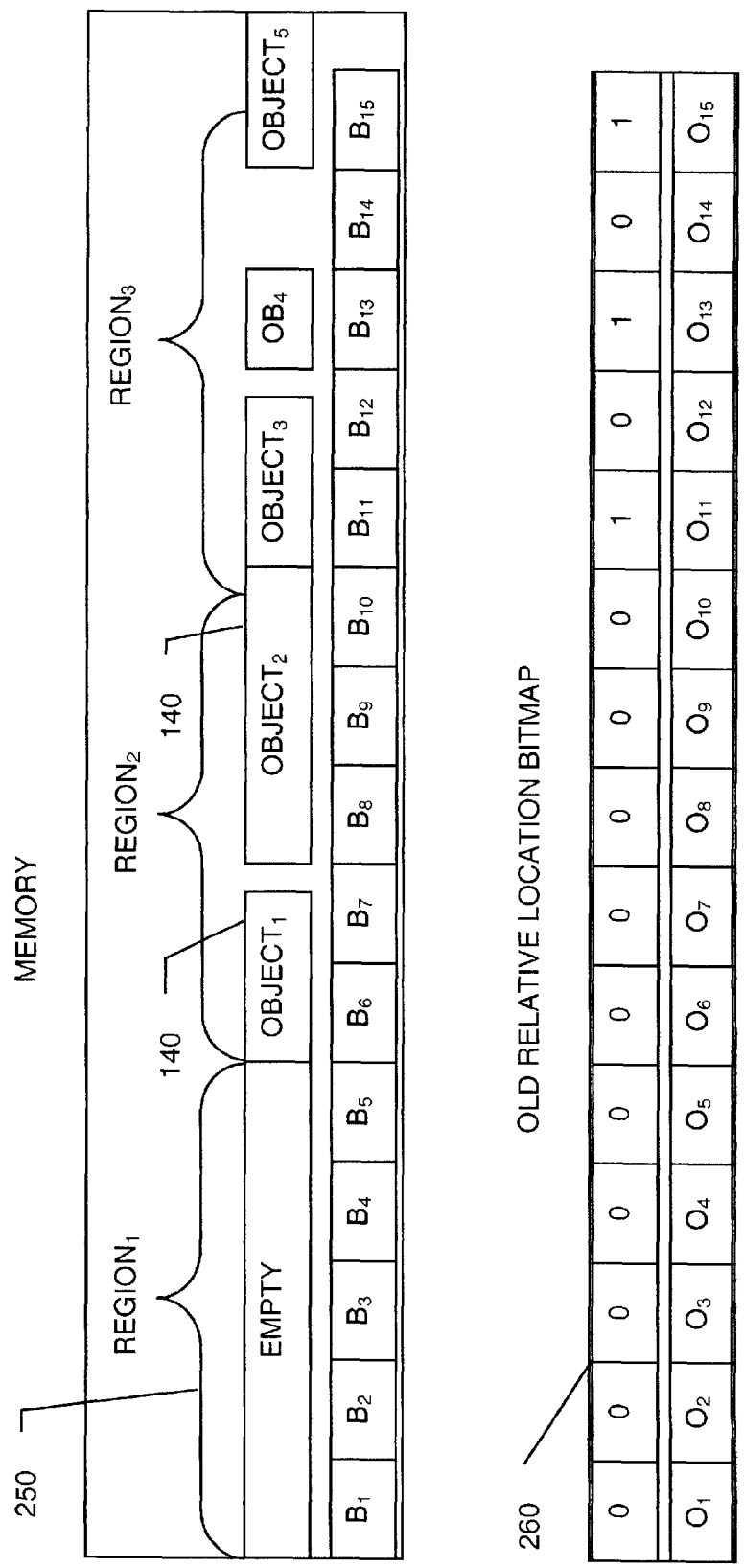
FIG. 2B is a pictorial representation of memory storage of an exemplary memory storage configuration prior to compaction and fixup, constructed and operative in accordance with a preferred embodiment of the present invention.
Figure 2C:
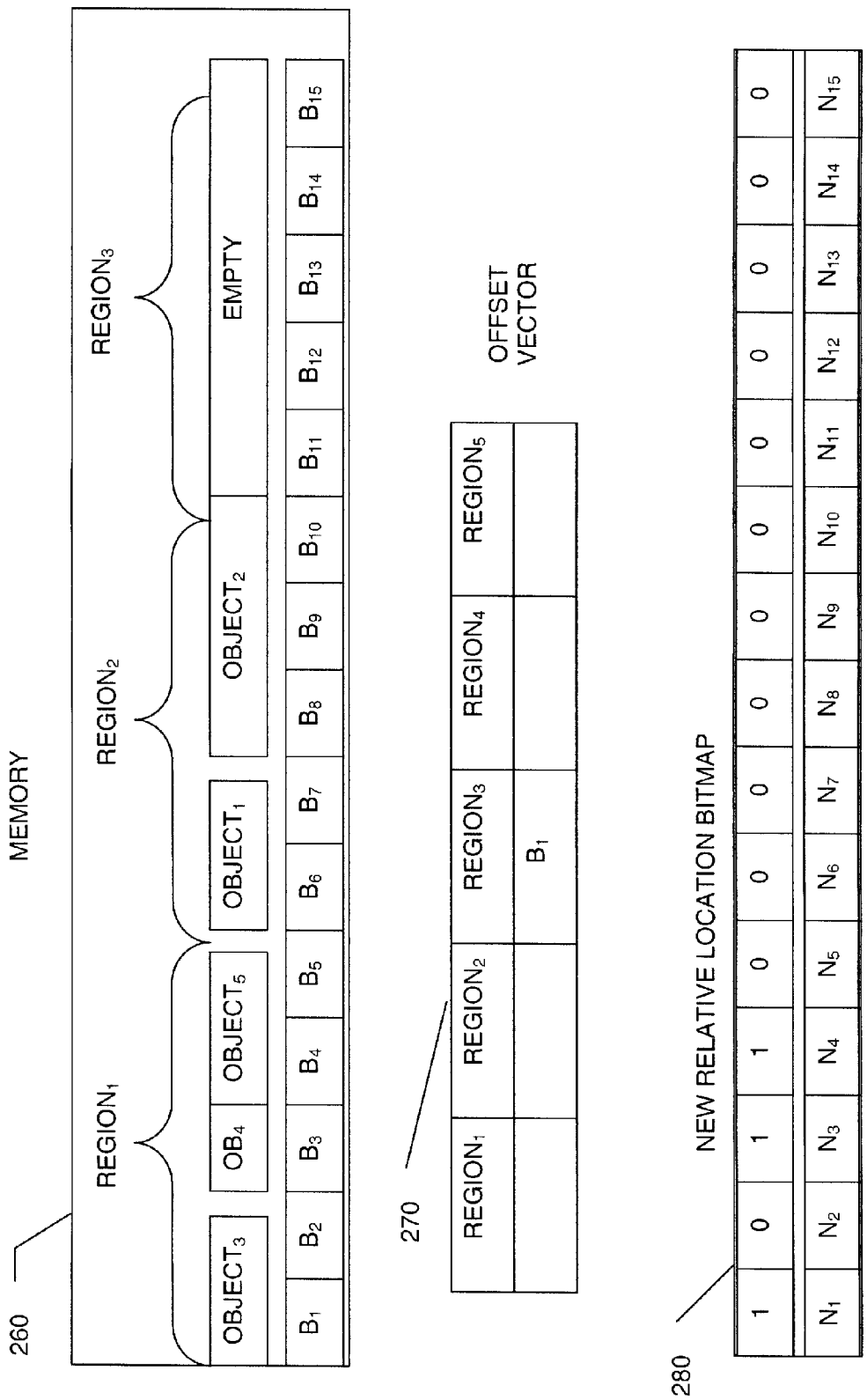
FIG. 2C is a simplified pictorial representation of an exemplary memory storage configuration after compaction and fixup, constructed and operative in accordance with a preferred embodiment of the present invention.
Figure 2D:
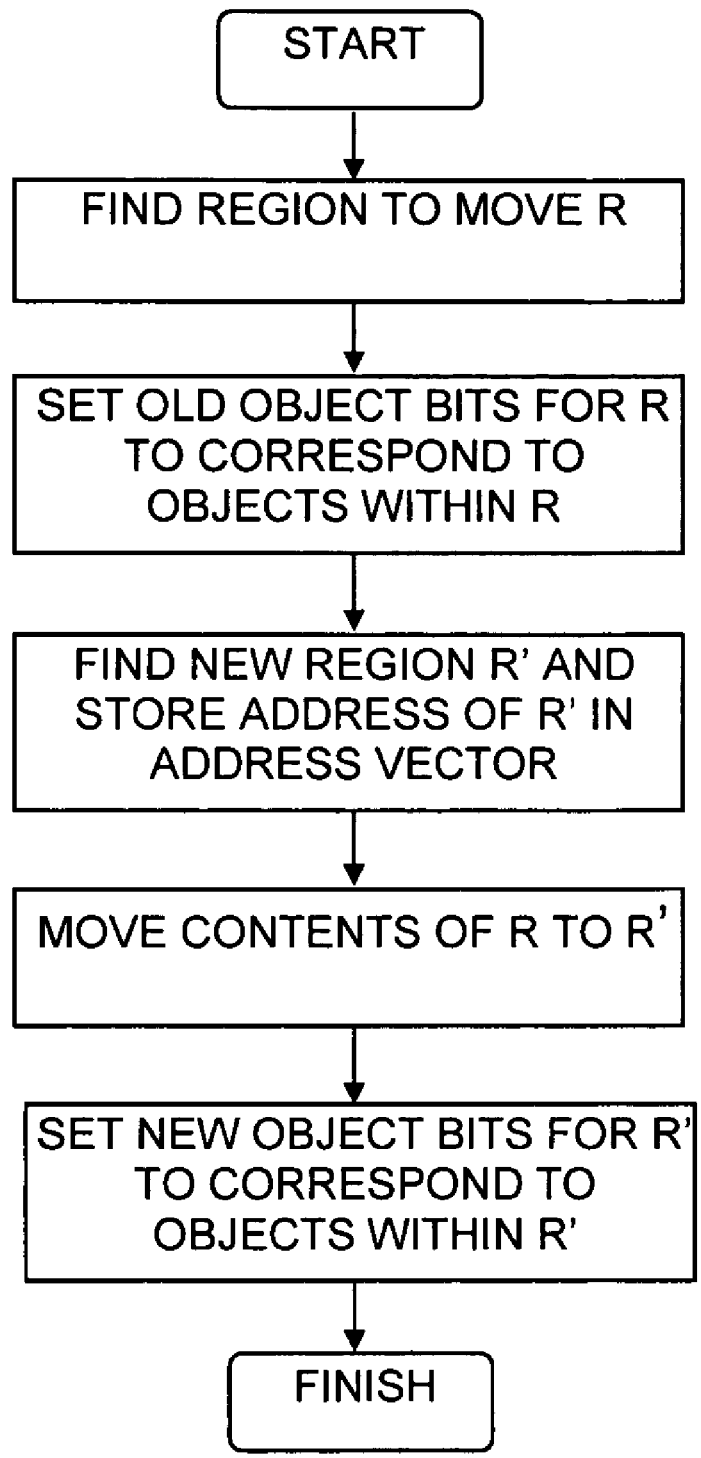
FIG. 2D is a simplified flow chart illustration of a method for compaction and fixup, operative in accordance with a preferred embodiment of the present invention.

Reference is now made to FIG. 2A, which is a simplified block diagram of a memory compaction and fixup system, FIG. 2B, which is a simplified pictorial representation of an exemplary memory storage configuration prior to compaction and fixup, FIG. 2C, which is a simplified pictorial representation of an exemplary memory storage configuration after compaction and fixup, and to FIG. 2D, which is a simplified flow chart illustration of a method for compaction and fixup, constructed and operative in accordance with preferred embodiments of the present invention.

Computer System 100 may employ an operating environment, such as a Java Virtual Machine (JVM), to provide an execution environment for an Application 200 and a Garbage Collector 210 to compact Memory 120. In the course of execution, Application 200 may store one or more Objects 140 in Memory 120. For Example, FIG. 2b depicts a series of Objects 140, labeled $Object_1$ through $Object_5$, stored in Memory 120.

Garbage Collector 210 preferably includes a Bit Mapper 220, a Mover 230 and a Fixer 240. Bit Mapper 220 typically designates one or more Regions 250 within Memory 120 such that each Region 250 is of a predefined size, and preferably of approximately equal size. Bit Mapper 220 may then associate one or more Objects 140 with a particular Region 250 if the start address of the Object 140 lies within the Region 250.

In FIG. 2b, Memory 120 is shown as having three regions designated $Region_1$, $Region_2$ and $Region_3$. $Region_1$ defines an unused section of Memory 120 that includes Blocks $B_1$ through $B_5$. $Region_2$ defines a section of Memory 120 that includes Blocks $B_6$ through $B_{10}$ and includes the start addresses of $Object_1$ and $Object_2$. $Region_3$ defines a section of Memory 120 that includes Blocks $B_{11}$ through $B_{15}$ and includes the start addresses of $Object_3$, $Object_4$ and $Object_5$.

During compaction, Mover 230 typically chooses a source region in Memory 120, such as $Region_3$, and a destination address in Memory 120, such as an address in $Region_1$. The destination address may lie in the same region as the source region or in a different region, and need not coincide with a region boundary, but should preferably coincide with a block boundary. Bit Mapper 220 typically constructs an Old Relative Location Bitmap 260 similar to Available Block Bitmap 150, with each bit $O_n$ positionally corresponding to a block $B_n$ in Memory 120. However, unlike Available Block Bitmap 150, each of the set bits in Old Relative Location Bitmap 260 indicates that a corresponding block in Memory 120 includes the start address of an Object 140. Bit Mapper 220 set the bits in Old Relative Location Bitmap 260 that are associated with the Objects 140 that lay within the source region chosen by Mover 230. Thus, in FIG. 2B, set bits $O_{11}$, $O_{13}$ and $O_{15}$ correspond to the start address of $Object_3$, $Object_4$ and $Object_5$ respectively.

Mover 230 typically moves and compacts Objects 140 located in the source region to the destination address. Preferably, one or more Objects 140 in the source region are moved as a group to the destination address, including all objects between the first and last objects in the group as it appears in the source region, where the relative order and position of the Objects 140 to one another are preserved, although the distances between the Objects 140 may be reduced or eliminated, and where no other objects from outside the group are inserted between objects within the group. Thus, in FIG. 2C, the relative position of $Object_3$, $Object_4$ and $Object_5$ within Memory 120 is preserved after they have been moved from $Region_3$ and compacted into $Region_1$.

Fixer 240 then places the new start address of the first Object 140 in the group of objects, being the destination address, into an Offset Vector 270 at an index corresponding to the source Region prior to the group of objects being moved. Thus, in FIG. 2C, the index of Offset Vector 270 corresponding to source $Region_3$ is used to store the start address $B_1$ of $Object_3$ in $Region_1$.

Bit Mapper 220 typically constructs a New Relative Location Bitmap 280 that is similar to Old Relative Location Bitmap 260, with each bit $N_n$ positionally corresponding to a block $B_n$ in Memory 120. New Relative Location Bitmap 280 preferably indicates blocks in Memory 120 in which the start address of moved Objects 140 are found. Thus, in FIG. 2C, $N_1$, $N_3$ and $N_4$ in New Relative Location Bitmap 280 are set, such as to 1, to correspond to the blocks $B_1$, $B_3$ and $B_4$ that include the start address of $Object_3$, $Object_4$ and $Object_5$ respectively.

Figure 3A:
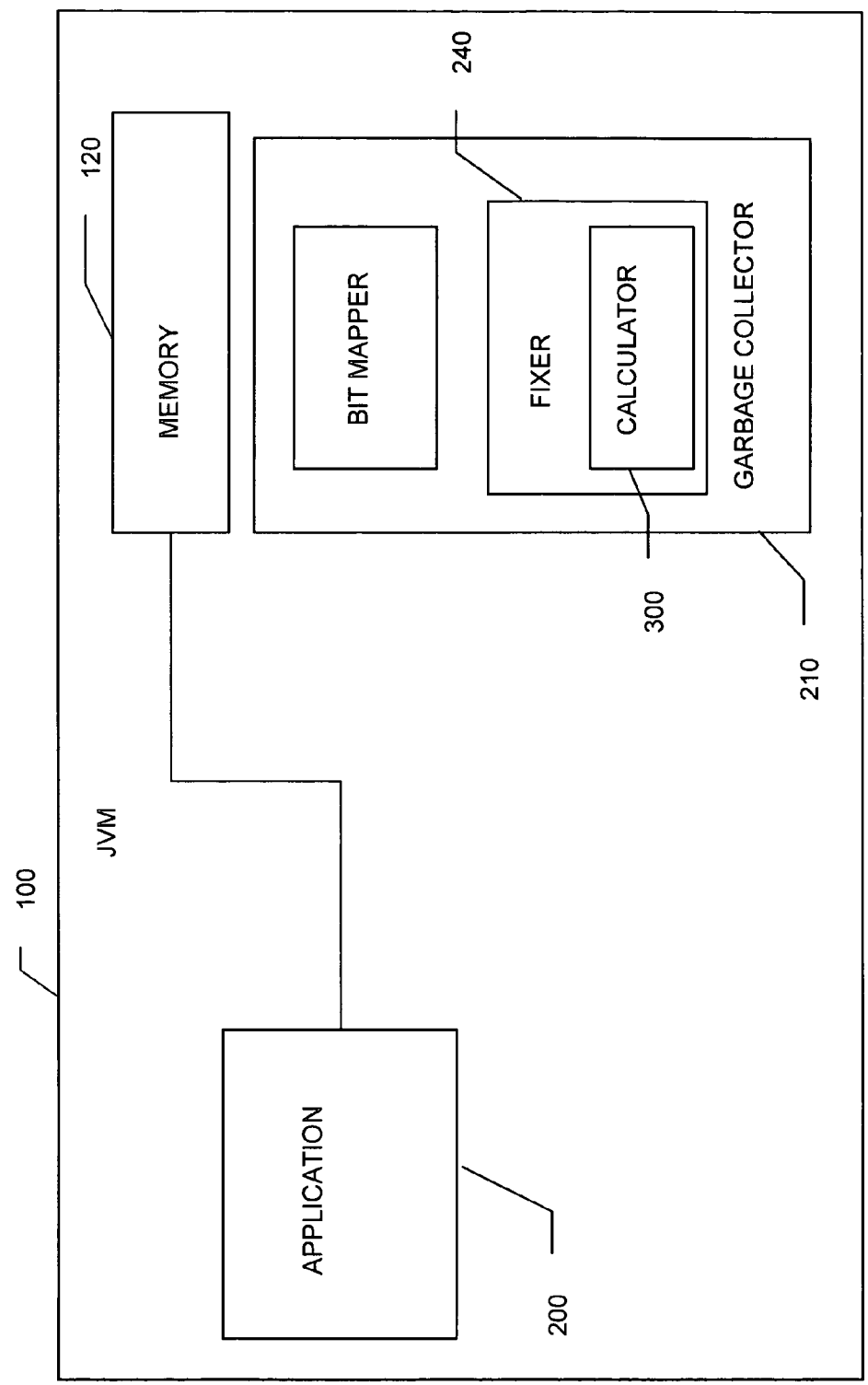
FIG. 3A is a simplified block diagram of a compacted object location system, constructed and operative in accordance with a preferred embodiment of the present invention.
Figure 3B:
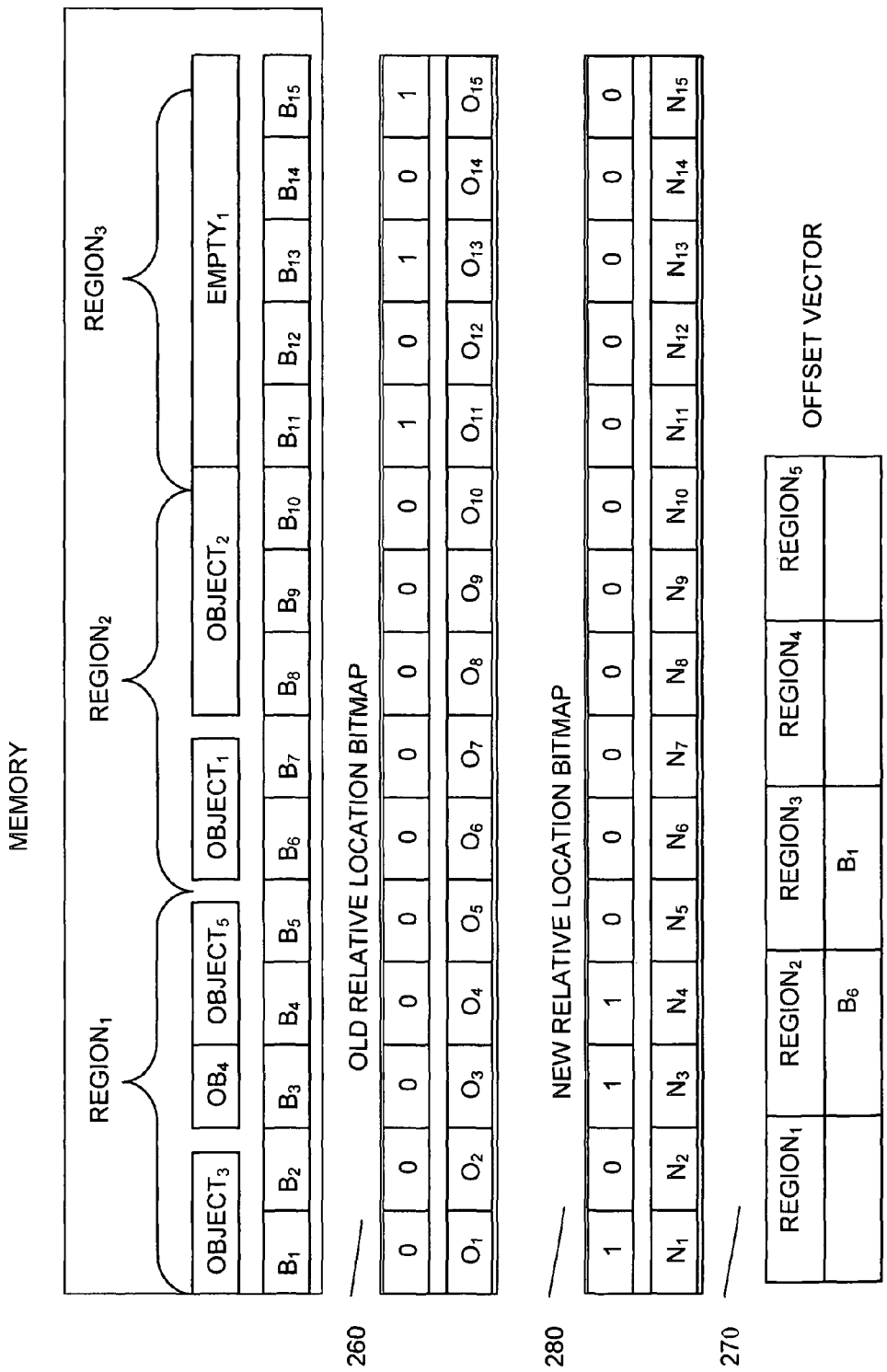
FIG. 3B is a pictorial representation of an exemplary compact memory storage configuration, constructed and operative in accordance with a preferred embodiment of the present invention.
Figure 3C:
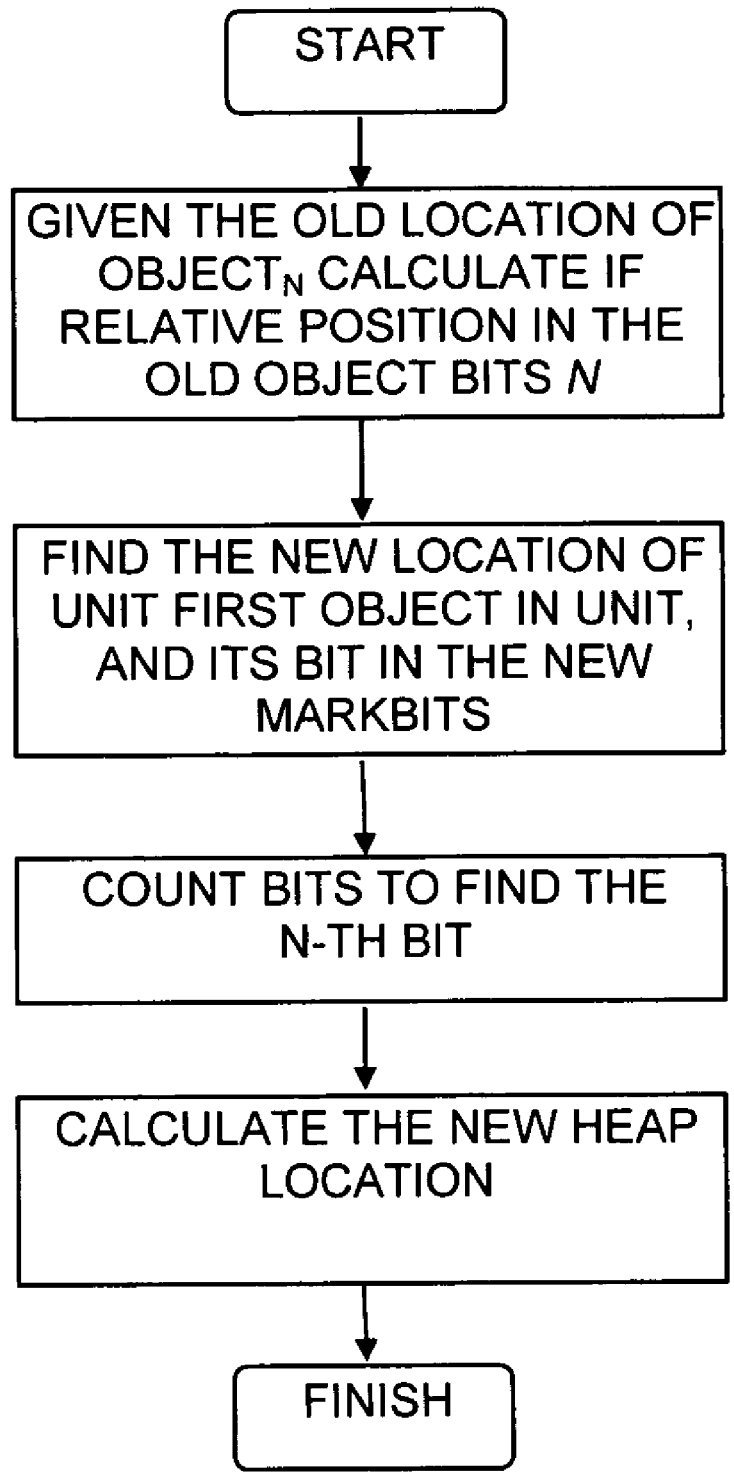
FIG. 3C is a simplified flow chart illustration of a method for compacted object location, operative in accordance with a preferred embodiment of the present invention.

Reference is now made to FIG. 3A, which is a simplified block diagram of a compacted object location system, FIG. 3B, which is a pictorial representation of an exemplary compact memory storage configuration, and to FIG. 3C, which is a simplified flow chart illustration of a method for compacted object location, constructed and operative in accordance with preferred embodiments of the present invention.

In addition to the elements described hereinabove with reference to FIG. 2A, Garbage Collector 210 may employ Fixer 240 to reassign pointers to the objects within Memory 120 during compaction by utilizing a Calculator 300 to determine the new start address of an object as follows.

Calculator 300 receives the old start address of the desired Object 140, and queries Bit Mapper 220 to determine the old Region 250 within which the desired Object 140 resided. Bit Mapper 220 consults Old Relative Location Bitmap 260 to determine the relative position of the desired Object 140 within Region 250. Calculator 300 queries Fixer 240, which in turn consults Offset Vector 270 for the new start address of the first Object 140 in the group of objects that were relocated from the old Region 250 to the destination address within Memory 120.

Given that the relative position of the desired Object 140 among the relocated group of objects is the same in both its old and new locations as the n-th object in the group of objects, Calculator 300 queries Bit Mapper 220 which consults New Relative Location Bitmap 280 and identifies the n-th set bit from the block corresponding to the new starting address of the first object in the relocated group of objects as corresponding to the block in which the start address of the desired Object 140 lies. The current address of the desired Object 140 may then be calculated by adding multiples of the block size to the new start address of the first Object 140 in the relocated group of objects until the block corresponding to the n-th set bit is reached.

Thus, in FIG. 3B, to fix the pointers to $Object_5$ in Memory 120, the old start address of $Object_5$, $B_{15}$, is first determined. The old Region 250 within which $Object_5$ resided, $Region_3$, is also determined, and Old Relative Location Bitmap 260 is consulted to determine the relative position of $Object_5$ within $Region_3$, which in FIG. 2B is shown as the third Object 140 within $Region_3$.

Offset Vector 270 is then consulted to determine the new start address of the first object in the relocated group of objects that were previously in $Region_3$ within Memory 120, now being $B_1$.

New Relative Location Bitmap 280 is then consulted to determine the address of the block in Region, corresponding to the third Object 140 in the region, being block $B_4$. Three block lengths are then added to address $B_1$, yielding the start address of block $B_4$, and thus the start address of $Object_5$, which may be employed to adjust the pointers to the Object 140.

One method for determining the relative position of a desired Object 140 is to traverse Old Relative Location Bitmap 260, counting the number of set bits starting from the first Object 140 in the Region 250, i.e. $Object_3$ in $Region_3$.

Yet another method for determining the relative location of a desired Object 140 is to directly traverse the Objects 140 in Memory 120. While this methodology requires Memory 120 to store the size of each Object 140, there is no need for New Relative Location Bitmap 280. Bit Mapper 220 may traverse Memory 120, counting the memory Objects 140 as they are encountered, starting at the new start address of the first object in the relocated group of objects.

Figure 4A:
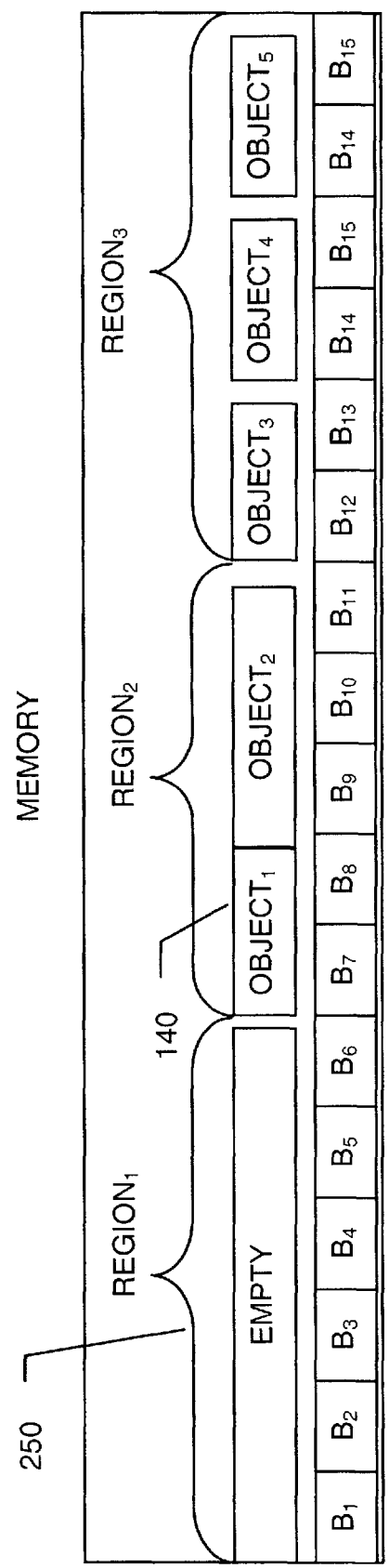
FIG. 4A is a pictorial representation an exemplary memory storage configuration prior to relocation and fixup, constructed and operative in accordance with a preferred embodiment of the present invention.
Figure 4B:
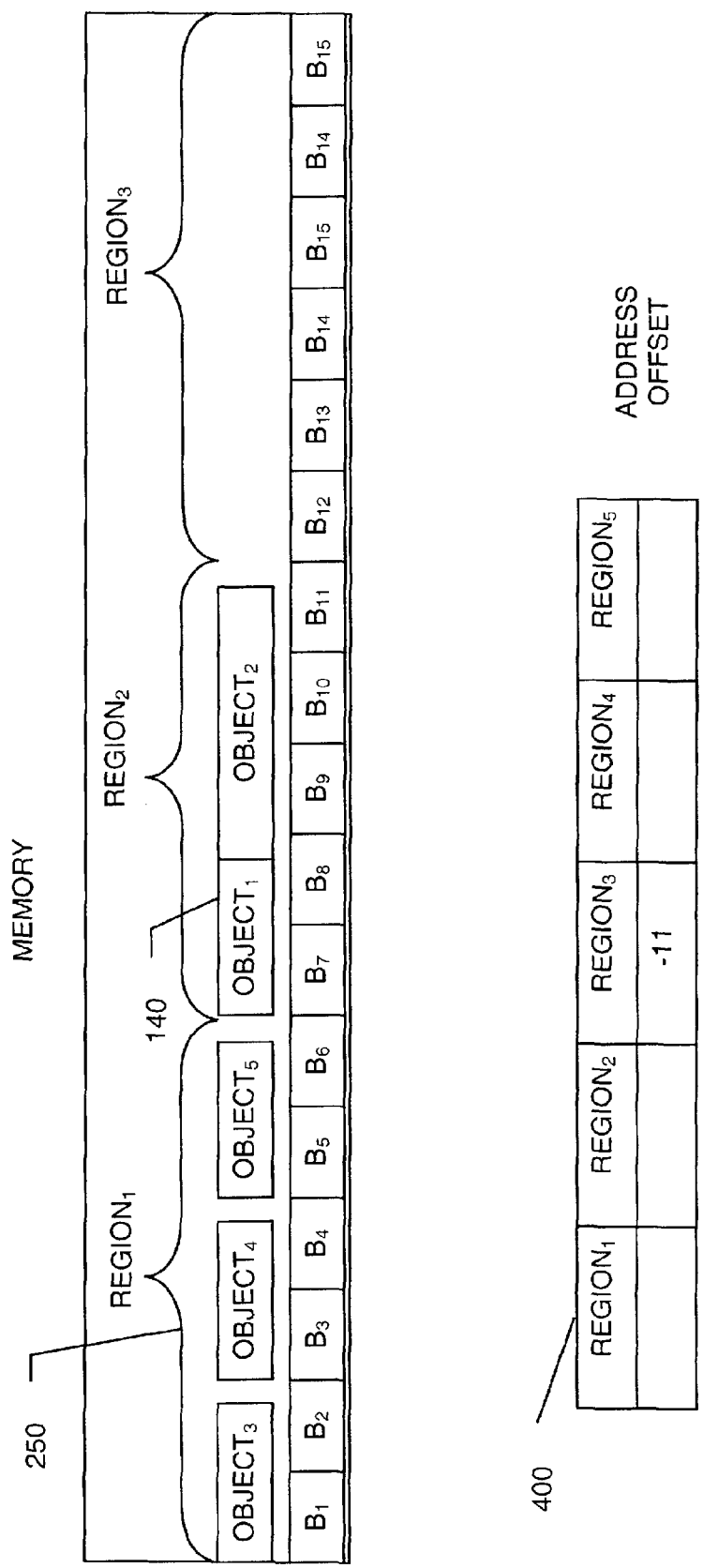
FIG. 4B is a simplified pictorial representation of an exemplary memory storage configuration after relocation and fixup, constructed and operative in accordance with a preferred embodiment of the present invention.
Figure 4C:
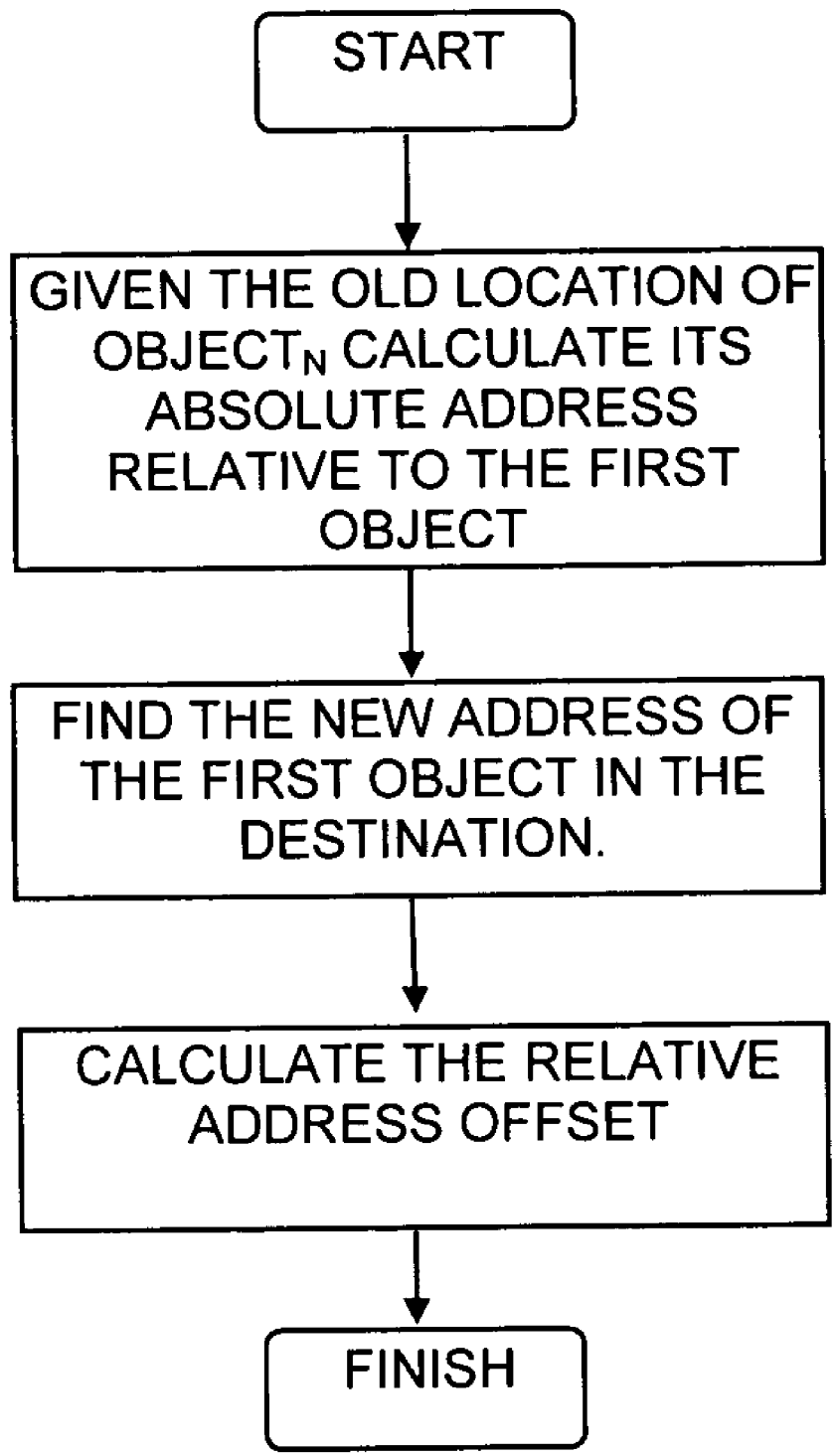
FIG. 4C a simplified flow chart illustration of a method for relocation and fixup, operative in accordance with a preferred embodiment of the present invention.

Reference is now made to FIG. 4A, which is a simplified pictorial representation of an exemplary memory storage configuration prior to relocation and fixup, to FIG. 4B, which is a simplified pictorial representation of an exemplary memory storage configuration after relocation and fixup, and to FIG. 4C, which is a simplified flow chart illustration of a method for relocation and fixup, constructed and operative in accordance with preferred embodiments of the present invention. FIGS. 4A, 4B, and 4C are similar to FIGS. 2A, 2B, and 2C respectively, with the notable exception that during the relocation phase each object in a group of Objects 140 located in the source region is relocated at an offset from its current location in the source region preferably such that the distances between the Objects within the group are preserved. An Address Offset Vector 400 corresponding to the source region is used to store the offset of the new location of each object relative to its previous location. For example, in FIG. 4B, $Object_3$, $Object_4$ and $Object_5$ are relocated from $Region_3$ to a destination address at an offset of minus eleven blocks. The address offset, minus eleven blocks of memory, is stored in Address Offset Vector 400.

During the fixup stage, the address of a desired Object 140 is calculated by adding the Address Offset Vector 400 corresponding to the desired object's previous region to the object's previous address. In the example presented hereinabove $Object_5$ is located eleven blocks from its original location, thus pointers to $Object_5$, which previously pointed to $B_{15}$ are adjusted to point to $B_4$.

It is appreciated that one or more of the steps of any of the methods described herein may be omitted or carried out in a different order than that shown, without departing from the true spirit and scope of the invention.

While the methods and apparatus disclosed herein may or may not have been described with reference to specific computer hardware or software, it is appreciated that the methods and apparatus described herein may be readily implemented in computer hardware using conventional techniques.

While the present invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and

What is claimed is:

1. A garbage collector embodied in a non-transitory computer-readable medium, said garbage collector comprising:
   a bit mapper configured to:
      designate a plurality of regions within a memory,
      associate any of a plurality of objects with any of said regions if the start address of said object to be associated lies within said region, and
      record the relative order and position of a group of objects within any of said regions;
   a mover configured to:
      remove any of said groups of objects from a source region from among said regions, and
      insert said removed group of objects into a destination region from among said regions such that the relative order and position of said objects within said removed group of objects prior to the removal of said group of objects from said source region is preserved within said inserted group of objects within said destination region; and
   a fixer configured to record at an index corresponding to said source region a destination address where the first object in said inserted group was inserted into said destination region, wherein said fixer further comprises a calculator configured to receive the old start address of a desired object,
determine the source region within which said desired object originated,
determine the relative position of said desired object within said source region,
determine the new start address of the first object in said inserted group of objects,
determine the block in which the start address of said desired object lies as being at the same relative position from said first object as in said source region, and
calculate the current address of said desired object by adding multiples of the block's size to said new start address until the block in which the start address of said desired object lies is reached.

2. A method for relative positioning of memory objects, the method comprising:
designating a plurality of regions within a memory,
associating any of a plurality of objects with any of said regions if the start address of said object to be associated lies within said region;
recording the relative order and position of a group of objects within any of said regions;
removing any of said groups of objects from a source region from among said regions;
inserting said removed group of objects into a destination region from among said regions such that the relative order and position of said objects within said removed group of objects prior to the removal of said group of objects from said source region is preserved within said inserted group of objects within said destination region;
storing at an index corresponding to said source region a destination address where the first object in said inserted group was inserted into said destination region; and
determining the new start address of a desired object among any of said inserted objects, by
receiving the old start address of said desired object,
determining the source region within which said desired object originated,
determining the relative position of said desired object within said source region,
determining the new start address of the first object in said inserted group of objects,
determining the block in which the start address of said desired object lies as being at the same relative position from said first object as in said source region, and
calculating the current address of said desired object by adding multiples of the block's size to said new start address until the block in which the start address of said desired object lies is reached.

* * * * *